US009199855B2

(12) United States Patent
Urbani et al.

(10) Patent No.: US 9,199,855 B2
(45) Date of Patent: *Dec. 1, 2015

(54) CHEMICAL TREATMENT TO IMPROVE RED MUD SEPARATION AND WASHING IN THE BAYER PROCESS

(71) Applicant: NALCO COMPANY, Naperville, IL (US)

(72) Inventors: Carl Urbani, Forrestfield (AU); John D Kildea, Baldivis (AU); Ryan Chester, Heathrisge (AU); Jing Wang, Aurora, IL (US)

(73) Assignee: Nalco Company, Naperville, IL (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/729,744

(22) Filed: Dec. 28, 2012

(65) Prior Publication Data
US 2013/0112627 A1 May 9, 2013

Related U.S. Application Data

(63) Continuation-in-part of application No. 13/662,964, filed on Oct. 29, 2012, which is a continuation-in-part of application No. 12/852,910, filed on Aug. 9, 2010, now Pat. No. 8,298,508.

(51) Int. Cl.
B01D 37/03 (2006.01)
B01D 37/04 (2006.01)
B01D 21/01 (2006.01)
C01F 7/14 (2006.01)
C01F 7/06 (2006.01)
C01F 7/47 (2006.01)

(52) U.S. Cl.
CPC .............. C01F 7/0653 (2013.01); B01D 21/01 (2013.01); B01D 37/03 (2013.01); B01D 37/04 (2013.01); C01F 7/145 (2013.01); C01F 7/148 (2013.01); C01F 7/47 (2013.01)

(58) Field of Classification Search
CPC ........ B01D 37/03; B01D 37/04; B01D 37/00; B01D 67/0006; B01D 69/125; C01F 7/148
See application file for complete search history.

(56) References Cited

U.S. PATENT DOCUMENTS

| | | | |
|---|---|---|---|
| 3,085,853 A | 4/1963 | Lesinski et al. | |
| 3,397,953 A | 8/1968 | Galvin et al. | |
| 3,445,187 A | 5/1969 | Siebert | |
| 3,541,009 A | 11/1970 | Arendt et al. | |
| 3,681,012 A | 8/1972 | Siebert et al. | |
| 4,339,331 A | 7/1982 | Lim | |
| 4,478,795 A | 10/1984 | Hereda et al. | |
| 4,737,352 A | 4/1988 | Owen | |
| 4,767,540 A | 8/1988 | Spitzer et al. | |
| 5,008,089 A | 4/1991 | Moody et al. | |
| 5,041,269 A | 8/1991 | Moody et al. | |
| 5,049,612 A | 9/1991 | Bulatovic | |
| 5,091,159 A | 2/1992 | Connelly et al. | |
| 5,106,599 A | 4/1992 | Roe | |
| 5,217,620 A | 6/1993 | Mahoney et al. | |
| 5,346,628 A | 9/1994 | Sommese et al. | |
| 5,387,405 A | 2/1995 | Connelly et al. | |
| 5,478,477 A | 12/1995 | Ramesh et al. | |
| 5,534,235 A | 7/1996 | Reed et al. | |
| 5,716,530 A | 2/1998 | Strominger et al. | |
| 5,853,677 A | 12/1998 | Avotins et al. | |
| 6,033,579 A | 3/2000 | Riemer et al. | |
| 6,048,463 A | 4/2000 | Selvarajan et al. | |
| 6,365,116 B1 | 4/2002 | Barham et al. | |
| 6,605,674 B1 | 8/2003 | Whipple et al. | |
| 6,726,845 B1 | 4/2004 | Barham et al. | |
| 6,740,249 B1 | 5/2004 | Barham | |
| 6,814,873 B2 | 11/2004 | Spitzer et al. | |
| 8,298,508 B2 | 10/2012 | Wang | |
| 2007/0172405 A1 | 7/2007 | Liu | |
| 2008/0107578 A1 | 5/2008 | Wang et al. | |
| 2008/0257827 A1 | 10/2008 | Dai et al. | |
| 2012/0034142 A1 | 2/2012 | Wang et al. | |

FOREIGN PATENT DOCUMENTS

| | | |
|---|---|---|
| AU | 5310690 A | 10/1990 |
| AU | 737191 B2 | 8/2001 |
| WO | WO97-41064 A1 | 11/1997 |
| WO | WO9929626 A1 | 6/1999 |
| WO | WO2009085514 A2 | 7/2009 |
| WO | WO2012031316 A1 | 3/2012 |

OTHER PUBLICATIONS

B.J Gladman et al, "Understanding the Thickening Process" Paste 2006, pp. 5-23.*
Step change improvements in underflow rheology by Berger A. et al., Proceedings of the 14th International Seminar on Paste and Thickened Tailings, pp. 135-141 (2011).
Effect of Surfactants on Bauxite Residues Suspensions Viscosity by Frost, R, et al, Colloids and Surfaces A: Physicochemical and Engineering Aspects, 292(1), pp. 21-26 (2007).
Kapusniak, Janusz et al., "Starch Based Depressors for Selective Flotation of Metal Sulfide Ores," Starch, vol. 51, No. 11-12, 2000, pp. 416-421.
Termes, S.C. et al., "Insoluble crosslinked starch xanthate as a selective flocculant for sulfide minerals," Transactions of the American Institute of Mining, Metallurgical, and Petroleum Engineers, Society of Mining Engineers of AIME, vol. 274, 1983, pp. 1971-1977.

* cited by examiner

Primary Examiner — Anthony J Zimmer
Assistant Examiner — Justin Bova
(74) Attorney, Agent, or Firm — Benjamin Carlsen

(57) ABSTRACT

The invention provides methods and compositions for improving the rheology of red mud removed from Bayer Process liquor. The method includes adding a flocculant and a cross-linked polysaccharide to the liquor. This combination separates the red mud from the liquor but also prevents the red mud from becoming too thick. By preventing excessive thickness, the method allows for the formation of extremely dense amounts of red mud even in primary settlers because the dense red mud can still flow. As a result a user can simultaneously enjoy both easy handling of red mud and also high recovery rates of valuable alumina and caustic from the red mud.

10 Claims, No Drawings

CHEMICAL TREATMENT TO IMPROVE RED MUD SEPARATION AND WASHING IN THE BAYER PROCESS

CROSS-REFERENCE TO RELATED APPLICATIONS

This application is a continuation in part of co-pending U.S. patent application Ser. No. 13/662,964 filed on Oct. 29, 2012 which in turn is a continuation in part of U.S. patent application Ser. No. 12/852,91.0 filed on Aug. 9, 2010 and which has issued as U.S. Pat. No. 8,298,508.

STATEMENT REGARDING FEDERALLY SPONSORED RESEARCH OR DEVELOPMENT

Not Applicable.

BACKGROUND OF THE INVENTION

The invention relates to compositions, methods, and apparatuses for improving the performance of primary settlers and washer circuits for red mud in a Bayer Process. As described for example in U.S. Pat. Nos. 6,814,873, 6,033,579, 6,048,463, and US Published Patent Application 2008/0257827, in the Bayer Process alumina trihydrate is extracted from bauxite ore. Bauxite ore is pulverized then goes through a digestion stage (where it is slurried in a caustic liquor medium and is heated under pressure), a clarification stage, a precipitation stage, a classification stage, and finally a calcination stage from which the final product is recovered.

In the clarification stage red mud is separated from the alumina in the ore. Red mud is the large percentage of the ore that remains insoluble after digestion with caustic medium. This insoluble traction must be removed prior to the alumina trihydrate recovery step in the process so as to avoid contaminating the final Bayer Process product. The digestion slurry consists of finely suspended mud particles which are commonly removed by the addition of flocculants in large separation vessels called thickeners or settlers. The flocculant acts to bind the mud particles increasing their rate of settling in the thickener. The overflow liquor then typically reports to filters, often referred to as Security Filtration, to remove any remaining insoluble material prior to alumina trihydrate recovery. The red mud slurry from the thickener underflow contains valuable alumina and caustic in solution that is recovered in the Red Mud Washer Circuit otherwise known as a counter-current decantation (CCD) circuit. Over several stages, mud slurry is mixed with progressively more dilute (lower in valuable alumina and caustic) wash water. The advancing wash water progressively increases in caustic and alumina content as it recovers the valuables from the mud slurry, then ultimately exits as a dilution stream for use back into the process at an appropriate point. The resulting red mud is sent to disposal. Some examples of red mud clarification are described in U.S. Pat. Nos. 3,085,853, 3,397,953, 3,445,187, 3,541,009, 3,681,012, 4,767,540, and 5,008,089.

Because of the cost associated with each additional filtration and dilution step, large savings and efficiencies can be realized from reducing the number or intensity of the required filtration and dilution steps. As a result, there is clear utility in novel methods of more effectively flocculating and separating red mud from the red mud-containing liquors.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR§1.56(a) exists.

BRIEF SUMMARY OF THE INVENTION

At least one embodiment of the invention is directed towards improving the process of separating and washing insoluble red mud solids in the Bayer process by addition of cross-linked polysaccharides in combination with flocculants in the primary settling and washing stages of the process.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Clarifier" means a separation device used for red mud clarification including: a thickener, a settler, or a washer.

"Consisting Essentially of" means that the methods and compositions may include additional steps, components, ingredients or the like, but only if the additional steps, components and/or ingredients do not materially alter the basic and novel characteristics of the claimed methods and compositions.

"Dextran" is a polysaccharide characterized as being an α-D-1,6 glucose-linked glucan with side chains 1-3 linked to the backbone units of the polysaccharide.

"Distal" is the opposite of "Proximal" and means subsequent to a particular step in a sequential process.

"Flocculant" means a composition of matter which when added to a liquid containing finely divided suspended particles, destabilizes and aggregates the solids through the mechanism of interparticle bridging, it may have a low charge density and/or may have a high molecular weight (in excess of 1,000,000).

"Green Liquor" means the alumina containing liquor that has passed through a Security Filtration stage and no longer contains red mud.

"Liquor" or "Bayer liquor" means a caustic, liquid medium that has run through a Bayer process in an industrial facility.

"Polysaccharide" means a polymeric carbohydrate having a plurality of repeating units comprised of simple sugars, the C—O—C linkage formed between two such joined simple sugar units in a polysaccharide chain is called a glycosidic linkage, and continued condensation of monosaccharide units will result in polysaccharides, common polysaccharides are amylase and cellulose, both made up of glucose monomers, polysaccharides can have a straight chain or branched polymer backbone including one or more sugar monomers, common sugar monomers in polysaccharides include glucose, galactose, arabinose, mannose, fructose, rahmnose, and xylose.

"Primary Settler Feed" means Bayer process digested slurry as charged to the first solids/liquid separation stage, it may be an admixture of the digested slurry plus dilution liquor, and the dilution liquor is routinely the counter current technique wash water from the red mud washing stages, the primary settler feed differs from the liquors or slurries subjected to clarification and/or separation in the subsequent clarification stage or the red mud washing stages by composition as to the solids content, dissolved sodium alum mate content, and total alkalinity, in addition, the primary settler feed also differs from the liquors or slurries subjected to clarification and/or separation in the subsequent clarification stage or the red mud washing stages in that no insoluble fraction thereof has received an earlier flocculation treatment.

"Proximal" is the opposite of "Distal" and means prior to a particular step in a sequential process.

"RedMud" means the insoluble solid material which is a residual product from the Bayer liquor that does not freely dissolve during the digestion stage, or which precipitates as part of the digestion process. Red mud can comprise ferric oxide (from which the mud typically derives its red-brown color), alumina, silica, silicon oxide, calcium oxide, sodium alumino-silicates, and/or titanium oxides (depending on the specific compositions of the ore input into the Bayer process) as well as caustic and other materials from the digestion liquor that may be part of the liquid phase of the Bayer process red mud slurry.

"Rheology" means the interrelatedness of the flow rate and the elastic, viscous and/or plastic properties of flowing matter.

"Slurry" means a mixture comprising a liquid medium within which fine solid particles are dispersed or suspended.

"Thickener" or "Settler" means a vessel used to effect a solid-liquid separation of a slurry, often with the addition of flocculants, the vessel constructed and arranged to receive a slurry, retain the slimy for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

"Washer" means a vessel used to effect a solid-liquid separation of red mud from liquid by utilizing counter current, decantation separating the material into an underflow (a highly concentrated suspension typically at the bottom of the washer), and an overflow (a clarified liquid stream typically at the top of the equipment), the liquid used to effect the counter current may be water, liquor a mixture of water and liquor or overflow from elsewhere in the Bayer Process.

In the event, that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

At least one embodiment of the invention is directed towards a method of treating Bayer Process red mud slurry to enhance the recovery of caustic and alumina. The treatment can occur in settlers and In washer circuits. The method comprises contacting primary settler feed or washer feed slurry with a flocculant in combination with a modified polysaccharide. The method modulates the theology of thickened red mud allowing higher underflow densities to be targeted in each vessel of the Wash Circuit or in the primary settlers.

Red mud slurry flow in the clarification stage suffers from a number of contradictory properties. Ideally the underflow of a settler or washer should have a very high density. Such a high density results from highly effective removal of soluble caustic and alumina from the red mud underflow, so effective in fact that the red mud comprises only insoluble materials. However as solids density in the underflow increases, the yield stress of the slurry will also increase and consequently this reduces the ability of the underflow to actually flow through the equipment used in the clarification process. As a result, in practice the underflow density must be kept below a degree of thickness even though this means that valuable alumina and caustic remain within the underflow. This is a costly practice which reduces the amount of actual alumina that can be recovered from a given sample of ore to an amount significantly below its theoretical yield.

Additionally, by reducing the level of suspended solids that remain in the supernatant above the flocculated slurry formed in the primary settler liquor, the solids to be removed during the subsequent clarification of the overflow by filtration are diminished.

In at least one embodiment the method alters the rheology (viscosity, elasticity, and/or plasticity) of the underflow that passes through washer(s) and/or settler(s) such that the underflow has properties that would otherwise be associated with an underflow slurry of lower solids density. This allows operators to increase the underflow density in one, some, or all of the vessels of the circuit, resulting in better extraction efficiency of alumina and caustic and increased throughput.

In at least one embodiment the underflow passing through at least a portion of the circuit has a density so high that for the method, it would not be capable of passing through the washer(s) and/or settler(s) or would only be able to do so with the input of a significant amount of energy, effort, and/or cost.

Suitable flocculants generally have molecular weights in excess of 1,000,000 and often in excess of 5,000,000. The flocculants may be anionic, cationic and/or zwitterionic. The dose of flocculant depends on the properties of the slurry being treated and can be empirically determined by one of skill in the art. In general, the flocculant polymer dose required depends on both the nature of the feed slurry (settler or washer) and the type of flocculant used. However, typically dose rates are generally within the range of 10-500 g/T based on polymer solids, per ton of red mud and more preferably 30-400 g/T.

In at least one embodiment the flocculant is selected from the group consisting of: (i) homopolymers of acrylic acid, (ii) copolymers of acrylic acid and acrylamide, (iii) copolymers of acrylic acid and acrylamide modified to contain a hydroxamic acid moiety; and (iv) copolymers of acrylic acid and acrylamide modified to contain and comprise ammonium acrylate. In at least one embodiment the flocculant has a molecular weight greater than 10 million.

Similarly, while anionic polymer flocculants may be formed using anionic monomers, it is also possible to modify certain nonionic vinyl addition polymers to form anionically charged polymers. Polymers of this type include, for example, those prepared by the hydrolysis of polyacrylamide.

The flocculant may be prepared in the solid form, as an aqueous solution, as a water-in-oil emulsion, or as a dispersion in water. Representative anionic polymers include copolymers of acrylamide with sodium acrylate and/or 2-acryiamido 2-methylpropane sulfonic acid (AMPS) or an acrylamide homopolymer that has been hydrolyzed to convert a portion of the acrylamide groups to acrylic acid.

In at least one embodiment the polysaccharide is cross-linked. The cross linking may be achieved with a crosslinking agent. In at least one embodiment the cross-linking is accomplished by an the interaction with a cross linking agent on an ethylenically unsaturated monomer either containing at least two sites of ethylenic unsaturation or containing one site of ethylenic unsaturation and one site of a reactive group such as an epoxide or an aldehyde. Representative Cross-Linking Agents include N,N-methylenebisacrylamide, N,N-methylenebismethacrylamide, polyethylene glycol diacrylate, ethylene glycol dimethacrylate, diethylene glycol dimethacrylate, triethylene glycol dimethacrylate, polyethylene glycol dimethacrylate, polypropylene glycol dimethacrylate, N-vinyl acrylamide, divinyl benzene, triallyl ammonium salts, N-methyl allylacrylamide, glycidyl acrylate, acrolein, methylolacrylamide, glyoxal, epihalohydrins, dialdehydes diglycidyl ethers, and the like, and any combination thereof. In at least one embodiment the crosslinking agent is added to the cross-linked polymers at a dosage of from about 0.0001 to about 10, preferably from about 0.0001 to about 0.2 weight percent based on the weight of the polymers.

In at least one embodiment, upon flocculation of a primary settler feed, a clear liquor/mud interface will form, and will gradually settle, providing a clear liquor supernatant layer overlying a mud layer. The lower mud layer contains the flocculated material. The overlying supernatant is the liquor that is separated for subsequent filtration and contains only a minimal amount of mud solids. The invention diminishes the amount of suspended solids in such supernatant, and hence decreases the extent of filtration required to obtain a given purity of sodium aluminate solution.

In at least one embodiment, the solids captured by the combination of the flocculant and modified polysaccharide contain more of the minerals and solids comprised of silica and potassium such that the solids reporting to the overflow of the clarifier contain a lower amount of such materials, resulting in selective flocculation and settling of such materials.

In at least one embodiment, the polymeric flocculant and the polysaccharide are both added to the primary settler feed as aqueous solutions to facilitate rapid dispersion of each agent within the primary settler feed.

In at least one embodiment the method Is conducted according to and/or in conjunction with some or all of one or more of the: compositions, apparatuses, and methods used in the Bayer Process described in one or more of: U.S. Pat. Nos. 6,365,116, 6,726,845, 5,217,620, 5,478,477, 5,387,405, International Patent Application WO 99/29626, and scientific papers: *Step change improvements in underflow rheology* by Berger A. et al., Proceedings of the 14$^{th}$ International Seminar on Paste and Thickened Tailings, pp. 135-141 (2011), and *Effect of Surfactants on Bauxite Residues Suspensions Viscosity* by Frost, R, et al, Colloids and Surfaces A; Physicochemical and Engineering Aspects, 292(1), pp. 21-26 (2007).

EXAMPLES

The foregoing may be better understood by reference to the following examples, which are presented for purposes of illustration and are not intended to limit the scope of the invention.

Red mud settling tests were performed in order to evaluate the effect on liquor overflow clarity and settling rate with and without addition of a cross-linked polysaccharide to a standard anionic flocculant treatment. These tests involved mixing a known amount of flocculant solution (and polysaccharide where appropriate) into a cylinder containing Bayer process red mud slurry. After mixing, the cylinders were left to settle and after a given period of time the liquor at the surface of the cylinder was sampled, filtered and the filtered residue weighed. The clarity of the liquor is described in terms of overflow solids with units of gram per litre (essentially the lower the overflow solids the more effective the chemical treatment strategy).

Example 1

Samples of plant settler feed slurry were treated using a 0.1% solution of a commercially available 100% anionic latex flocculant and a 13% solution of a modified (cross-linked) polysaccharide. In this case the modified polysaccharide was dextran. Table 1 details the overflow solids for red mud slurry flocculated with (i) anionic flocculant and (ii) a combination of anionic flocculant and the cross-linked polysaccharide, Addition of modified polysaccharide to the slurry, at a dose rate in the order of 30 ppm, resulted in approximately 50% reduction in overflow solids. A substantial reduction in overflow solids was achieved over the flocculant dose range of 40-130 g/T.

TABLE 1

Overflow solids measured from red mud settling tests using a standard anionic flocculant with and without additional treatment with modified polysaccharide.

| Treatment | Dose Anionic Flocc (g/T) | Dose MPS (ppm active) | Overflow Solids (g/L) |
| --- | --- | --- | --- |
| AF | 43 | 0 | 1.28 |
| AF + MPS | 43 | 3.6 | 0.54 |
| AF | 85 | 0 | 1.19 |
| AF + MPS | 85 | 4.2 | 0.45 |
| AF | 128 | 0 | 0.71 |
| AF + MPS | 128 | 4.4 | 0.44 |

AF = Anionic Flocculant
MPS = Modified polysaccharide (cross-linked dextran)

Example 2

The method of application of the modified polysaccharide was assessed by addition of a modified polysaccharide prior to, with or after the flocculant addition. The anionic flocculant and modified polysaccharide were the same as those used in example 1 as was the test method. Slurry used was again plant settler feed, Table 2 details the overflow solids when the modified polysaccharide was pre-dosed, and co-dosed with the anionic flocculant in one set of tests and when it was co-dosed and post-dosed with the anionic flocculant in a second set of tests. The modified polysaccharide was effective in all methods of application, reducing the overflow solids when compared to the same dose of anionic flocculant applied without additional modified polysaccharide.

TABLE 2

Overflow data from settling tests comparing the method of application of a modified polysaccharide when applied with a conventional anionic flocculant.

| Dose Anionic Flocc (g/T) | Dose MPS (ppm active) | MPS added relative to flocculant | Overflow Solids (g/L) |
| --- | --- | --- | --- |
| 73 | 0 | — | 0.63 |
| 73 | 5.7 | Pre-dose | 0.29 |
| 73 | 5.7 | Co-dose | 0.31 |
| 73 | 0 | — | 0.69 |
| 73 | 5.7 | Post-dose | 0.32 |
| 73 | 5.7 | Co-dose | 0.37 |

Example 3

The use of polysaccharides such as dextran has previously been identified and used in combination with anionic flocculants as a clarity aid in red mud settlers (as described, for example, in U.S. Pat. No. 3,085,853). Red mud settling tests, as described above, were conducted to assess the relative efficacy of a modified (cross-linked) polysaccharide compared to the same unmodified polysaccharide. The anionic flocculant and modified polysaccharide were the same as those used in example 1. The modified and unmodified polysaccharide solutionss contained the same amount of polysaccharide in each treatment. Table 3 details the overflow solids of red mud treated with a combination of (i) anionic flocculant and cross-linked dextran and (ii) anionic flocculant with dextran. In this example a commercially available, 100% anionic flocculant was again used but it was a different product to that used in examples 1 and 2.

TABLE 3

Overflow solids from red mud testing with modified polysaccharide and unmodified polysaccharide combinations with anionic flocculant.

| Red Mud Treatment Regime | Anionic Flocculant Dose (g/T) | Polysaccharide Dose (ppm active) | Overflow Solids (g/L) |
|---|---|---|---|
| Anionic Flocculant | 75 | 0 | 0.43 |
| Anionic Flocculant + Polysaccharide | 75 | 0.60 | 0.34 |
|  |  | 1.20 | 0.33 |
| Anionic Flocculant + Modified Polysaccharide | 75 | 0.78 | 0.31 |
|  |  | 1.56 | 0.29 |

The data demonstrates that addition of modified polysaccharide is surprisingly more effective at reducing overflow solids compared with the use of unmodified polysaccharide.

Example 4

Analysis of the solids obtained from settling tests conducted as described in the previous examples was completed to determine the nature of the solids removed by the application of modified polysaccharide. Red mud settling tests were completed using a combination of commercially available hydroxamated anionic flocculant both with and without additional application of a cross linked polysaccharide. The treatment and overflow solids obtained is listed in table 4.

TABLE 4

Overflow solids from red mud settling tests using a hydroxamated anionic flocculant and modified polysaccharide.

| Dose Anionic Flocculant (g/T) | Dose MPS (ppm active) | Overflow Solids (mg/L) |
|---|---|---|
| 150 | 0 | 112 |
| 150 | 1 | 72 |
| 150 | 2 | 62 |
| 150 | 3.5 | 45 |

Additionally, samples of the overflow solids were collected, dried and subjected to X-ray fluorescence spectroscopy (XRF) to determine the elemental components present in the overflow. Table 5 shows the amount and relative change in a range of elements analyzed in the treated samples. Surprisingly treatment with the cross-linked polysaccharide results in significantly less silica and potassium containing materials reporting in the overflow solids. When compared to the reduction in the relative amounts of other elements such as iron, titanium and calcium, there is a lot less silica and potassium in the treated samples. This indicates that the modified polysaccharide is selective in removing insoluble minerals which may be high in silica and potassium content. Examples of such minerals would be muscovite or mica.

TABLE 5

Concentration of product (expressed as ppm or mg of analyte per litre of overflow)

| Analyte | Flocc treatment only | Flocc + MPS (1 ppm) | Flocc + MPS (2 ppm) | Flocc + MPS (3.5 ppm) | % Reduction in component from MPS treatment (3.5 ppm) vs Flocc only treatment (%) |
|---|---|---|---|---|---|
| $Fe_2O_3$ | 39.3 | 31.4 | 25.4 | 19.4 | 50.6 |
| $K_2O$ | 2.69 | 1.75 | 1.28 | 0.81 | 69.9 |
| $SiO_2$ | 18.6 | 12.5 | 9.7 | 5.8 | 68.8 |
| CaO | 1.34 | 1.08 | 0.90 | 0.73 | 45.5 |
| $TiO_2$ | 5.65 | 4.70 | 3.89 | 3.09 | 45.4 |

Example 5

Raked settling tests conducted in an Imhoff cone were performed to evaluate the effect of a flocculant/modified polysaccharide combination on the flow characteristics and rheology of flocculated red mud. These tests involved mixing one litre of Bayer plant final washer feed red mud slurry together with a known amount of conventional flocculant solution and modified polysaccharide solution in a cylinder. After mixing, the slurry was Immediately transferred to an Imhoff cone and the slurry was then raked to a specific mud bed volume (bed underflow density was calculated from the bed volume and known feed solids concentration). The Imhoff cone plug was then released and the time taken tor the thickened slurry to discharge from the cone was measured. The time required for discharge of the entire slurry is a measure of mud flow-ability (or rheology). This discharge time was compared with feed slurry treated with flocculant alone (the 'normal' process for the settler and washer circuit). The faster the discharge rate the better the mud underflow rheology and ultimately properties for pumping from the thickener underflow.

Table 6 details the average discharge rate of the thickened red mud slurry from the raked Imhoff cone after treatment with flocculant and after treatment with the combination of flocculant and modified polysaccharide. The flocculant dose was kept constant at 100 g/T while the dose of modified polysaccharide (when applied) was 3.75 ppm. In this case, the modified polysaccharide used was a cross-linked dextran. The flocculant used was a conventional polyacrylate/polyacrylamide flocculant commercially available and typically used for red mud settling in washers.

TABLE 6

Average time taken to discharge consolidated red mud slurry from an Imhoff cone across a range of average bed underflow densities. Flocculant dose was constant at 100 g/T. Polysaccharide dose was 3.75 ppm.

| Treatment Regime | Average Underflow Density (g/100 mL) | Discharge Time Recorded (sec) | Average Discharge Rate (mL/sec) |
|---|---|---|---|
| Flocculant | 20.0 | 10 | 100 |
|  | 21.3 | 60 | 17 |
|  | 21.4 | >300 | 0 |
|  | 22.9 | >300 | 0 |
|  | 25.0 | >300 | 0 |
|  | 34.0 | >300 | 0 |
| Flocculant + Modified Polysaccharide | 21.3 | 10 | 100 |
|  | 22.5 | 10 | 100 |
|  | 25.0 | 10 | 100 |

Raking of slurry treated with conventional flocculant to an average underflow density of greater than 21%, resulted In effectively no flow when the plug was removed. Effectively the slurry did not discharge from the Imhoff cone due to the poor flow characteristics of the raked, consolidated mud at the base of the cone.

This was compared to the results obtained after raking slurry that was treated with the same dose of conventional flocculant together with modified polysaccharide (3.75 ppm). Across a similar range of high average underflow densities, slurry discharged from the cone without restriction (~100 mL/sec). This is a significant increase in the flow properties of the red mud when compared to the control test (flocculant only treatment).

In a separate test mud was treated in a similar manner (the same flocculant at the same dose) but the modified polysaccharide dose was reduced to 0.75 ppm, When consolidated to an average underflow density of 23.8 /100 mL a discharge time of 19 seconds was recorded (average discharge rate of 53 ml/sec). Comparing this to the data from Table 1, consolidation of mud to this concentration without addition of modified polysaccharide would be expected to result in no flow, while a higher dose of modified polysaccharide (3.75) clearly results in substantially higher flow rates.

The results of these tests indicate that addition of flocculant and polysaccharide in combination to a red mud washer circuit or primary settler would enable the targeted underflow density to be substantially increased while fluid characteristics of the underflow solids could be maintained or enhanced.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or some of the various embodiments described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention, Those skilled in the art may recognize other equivalents to the specific embodiment described herein which equivalents are intended to be encompassed by the claims attached hereto.

The invention claimed is:

1. A method of treating a Bayer Process slurry containing comprising liquor and red mud, the method comprising: (a) adding to the slurry a flocculant and a cross-linked polysaccharide and (b) removing flocculated red mud contained in the slurry by at least one of: sedimentation, centrifugation, filtration, washing, and settling.

2. The method of claim 1, wherein the cross-linked polysaccharide is added to the slurry prior to the addition of the flocculant to the slurry.

3. The method of claim 1, wherein the cross-linked polysaccharide is added to the slurry after the addition of the flocculant to the slurry.

4. The method of claim 1, wherein the cross-linked polysaccharide is added to the slurry at the same time as the addition of the flocculant to the slurry.

5. The method of claim 1, wherein the flocculant red mud is removed by at least one of a primary settler and a red mud washer.

6. The method of claim 1, wherein the flocculant is selected from the group consisting of: (i) homopolymers of acrylic acid, (ii) copolymers of acrylic acid and acrylamide, (iii) copolymers of acrylic acid and acrylamide modified to contain a hydroxamic acid moiety, (iv) copolymers of acrylic acid and acrylamide modified to contain an ammonium acrylate, and (v) combinations thereof.

7. The method of claim 1, wherein the cross-linked polysaccharide comprises two or more different types of polysaccharide polymers.

8. The method of claim 1, wherein the cross-linked polysaccharide is cross-linked dextran.

9. The method of claim 1, wherein the flocculant has a molecular weight of greater than 10 million daltons.

10. The method of claim 1, further comprising raking the slurry after the addition of the flocculant and a cross-linked polysaccharide.

* * * * *